(12) United States Patent
Straulino

(10) Patent No.: US 7,376,420 B2
(45) Date of Patent: May 20, 2008

(54) METHOD AND NETWORK DEVICE FOR RUNNING ESPECIALLY PERSONALIZED COMMUNICATION SERVICES IN A COMMUNICATION SYSTEM

(75) Inventor: Heiko Straulino, Planegg-Martinsried (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 0 days.

(21) Appl. No.: 10/497,681

(22) PCT Filed: Dec. 4, 2001

(86) PCT No.: PCT/EP01/14175

§ 371 (c)(1),
(2), (4) Date: Nov. 23, 2004

(87) PCT Pub. No.: WO03/049458

PCT Pub. Date: Jun. 12, 2003

(65) Prior Publication Data

US 2005/0090249 A1   Apr. 28, 2005

(51) Int. Cl.
*H04Q 7/20* (2006.01)

(52) U.S. Cl. .................. 455/432.3; 455/435.1

(58) Field of Classification Search ............ 455/435.1, 455/432.3; 370/341, 352
See application file for complete search history.

(56) References Cited

U.S. PATENT DOCUMENTS

| 5,896,373 | A | 4/1999 | Mitts et al. |
|---|---|---|---|
| 6,301,479 | B1 | 10/2001 | Roobol et al. |
| 2003/0035401 | A1* | 2/2003 | Shaheen et al. ............. 370/341 |
| 2005/0111441 | A1* | 5/2005 | Koskelainen ................ 370/352 |

FOREIGN PATENT DOCUMENTS

| DE | 198 4 185 A1 | 8/1999 |
|---|---|---|
| DE | 198 49 578 A1 | 1/2000 |
| EP | 0 695 053 A2 | 7/1995 |
| EP | 0 869 629 A1 | 9/1997 |
| EP | 1 220 490 A1 | 10/2001 |
| WO | WO 00/44191 | 7/2000 |
| WO | WO0172008 | 9/2001 |
| WO | WO 02/47317 A1 | 6/2002 |

OTHER PUBLICATIONS

XP-002901411-V. Gurbani, "Accessing IN services from SIP networks", Internet Draft, Nov. 2000, pp. 1-18.

* cited by examiner

*Primary Examiner*—Jean Gelin
*Assistant Examiner*—Phuoc Doan
(74) *Attorney, Agent, or Firm*—Bell, Boyd & Lloyd LLP

(57) ABSTRACT

The invention relates to a method for running communication services or a corresponding service logic in a communication system (UMTS), whereby a station (A, B) logs on to an access device (PA or PB) of the communication system (UMTS), and service-related instructions depending on a service logic relating to the station (A or B) are emitted on the network side, in a network device on the connection path between the station (A, B) and another station (B or A). The aim of the invention is to enable the service logic to be updated without having to transmit it from the station with, for example, registration data each time. To this end, the service logic relating to said station (A or B) is called by the device (PA or PB) emitting the instruction, from a service data bank (DD) in which the service logic is stored on the network side.

7 Claims, 1 Drawing Sheet

Figure 1:
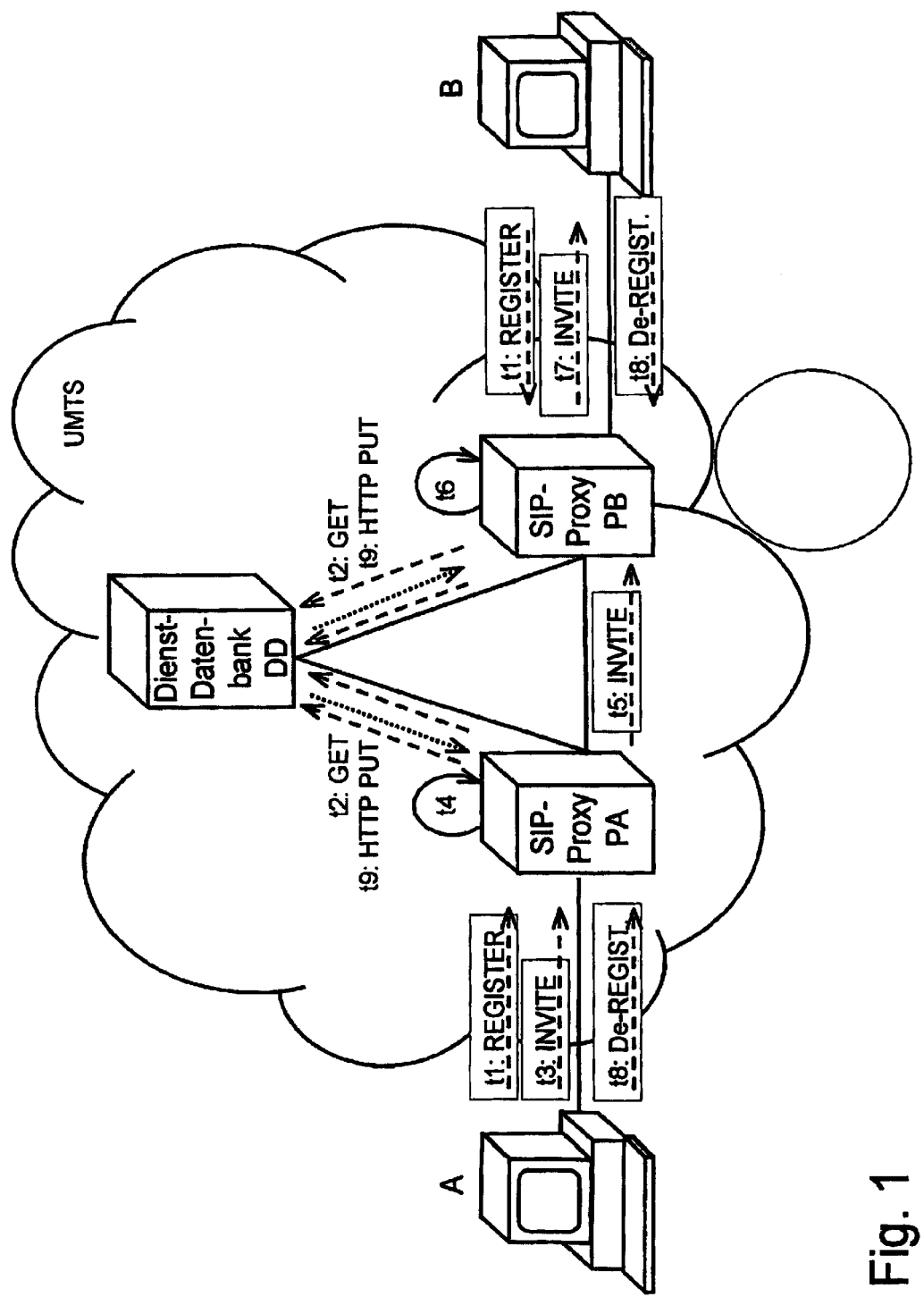

METHOD AND NETWORK DEVICE FOR RUNNING ESPECIALLY PERSONALIZED COMMUNICATION SERVICES IN A COMMUNICATION SYSTEM

CLAIM FOR PRIORITY

This application claims priority to International Application No. PCT/EP01/14175 which was published in the German language on Jun. 12, 2003, and filed in the German language on Dec. 4, 2001, the contents of which are hereby incorporated by reference.

TECHNICAL FIELD OF THE INVENTION

The invention relates to a method for running communication services in a communication system and to a network device for implementing such a method.

BACKGROUND OF THE INVENTION

In communication systems, for example mobile radio networks according to the GSM (Global System for Mobile Communication) or UMTS (Universal Mobile Telecommunication System) standard, connections between two stations or network elements that are located at a distance from each other are generally set up via a plurality of further network elements, so that the two end stations can communicate with each other.

The session initiation protocol SIP is known for signaling connections (sessions) between in particular mobile users or stations and this describes a protocol and a network infrastructure. According to this, SIP messages are routed from a source user or a first station generally via a plurality of signaling servers to a second station as the destination user. In order to be able to provide extended communication services, such as for example session forwarding, number translation, pre-paid, etc. in such a signaling environment, different approaches are under discussion, such as call processing language CPL, SIP servlets (SIP-Java programming interface), SIP CGI (common gateway interface/general SIP access interface). A service thereby generally comprises a service logic in the form of a program code and status information in the form of data. In the case of personalized services, said status information is station-specific or user-specific. When forwarding messages, the signaling servers run the service logic or execute its instructions, whereby status information is included. In this way the service logic can influence the response of the signaling server.

In such an environment problems arise due to the possibilities for distributing the service logic and status information. If a new service is launched, this information must be made available to the signaling servers involved in the running process. An obvious approach would be to install said information in a permanent manner for administrative purposes on a specific signaling server. In the case of personalized services, this would however require a user or their station always to use the same signaling server. This assumption is not practical for the following reasons:

a) in mobile radio networks users or their stations are generally mobile and can only or have to use a signaling server in their proximity, located for example in a local intranet, in a dynamic manner.
b) A signaling server may break down, whereupon the user or their station must be able to use an alternative server. The information would also have to be installed on such a server to be made additionally available.
c) A load distribution method can generally be used in mobile radio networks, to assign users or their stations to the signaling server with the smallest load out of a plurality of signaling servers.

This possibility would also not be applicable or would require the information to be installed on the plurality of signaling servers.

These problems occur in particular in systems, as for example with the multimedia subsystem architecture defined by 3GPP ($3^{rd}$ Generation Partnership Project), according to which a signaling server from a plurality of available signaling servers is allocated to a user-side station in a dynamic manner during the registration process.

IETF proposals from the internet field (IETF: Internet Engineering Task Force), such as Java Enhanced SIP (JES) and servlet delivery (SDLI), describe methods, by means of which service logic and status information can be transported together with signaling messages. Stations or terminals "append" the service logic to messages, whereby the signaling servers extract said information and run the service logic as required. However such approaches do not resolve the above problem satisfactorily:

d) In a mobile network environment the bandwidth of the air interface is a valuable resource. It would be a waste of this resource, if a large amount of service logic and status information were transmitted from the stations into the network.
e) For security reasons many network operators also have serious misgivings about receiving and running just any service logic from user-side stations. This could have an adverse effect on the stability of the network.
f) Also status information changes, which may result from the running of a service, cannot be stored permanently. This would be necessary however, if this changed status information were required for the repeat running of a service.
g) It should be possible to run many services without involving an end station, e.g. call forwarding when the station is not available.

SUMMARY OF THE INVENTION

The invention discloses a method for providing communication services in a communication system with a view to distributing service logic and status information on signaling servers and to propose a network device for implementing such a method.

Advantageously, a service logic, in other words an executable program code, is stored in a network-side storage device, which network-side stations can access, when a station logs on or registers that a connection is to be set up for or to such a station or data is to be forwarded for such a station. The term connection of course not only covers a finally set-up communication connection but also simple signaling with control instructions, information data transmissions, etc.

Status information relating to such stations is preferably stored in the service database together with the service logic, so that this can also be called. When the service logic or information has changed, it should be possible to update the service logic and/or status information in the service database from the device running the service logic.

In mobile radio networks, mobile users or their stations are no longer mandatorily assigned to a specific signaling server in proximity to them. If a signaling server breaks down, the user and their station can simply use an alternative server. Instead of having to provide all the data on a plurality of alternative servers, it is adequate to provide a few replacement servers or databases in the network, which either receive the data by means of mirroring technology or from the actual database in the event of a breakdown. In principle transmission, as already known per se, from the station to the access device and via that to the service database is also possible.

A load distribution method can also be used in communication networks, to assign users or their stations in each instance to the signaling server with the smallest load out of a plurality of signaling servers.

The air interface is advantageously not loaded with a plurality of service logic data. Transmission can be reduced to a minimum or no transmissions at all.

Network operators can also block receipt of any service logic from user-side stations or only permit it via a reliably verifiable registration path. This would offer the network operator a higher level of security but means a reduction in flexibility from the point of view of the user due to the need for prior registration of a new service logic.

Status information changes, which result from the running of a service, can also be stored permanently in this way, which ultimately relieves the load on the network further, as the number of transmissions can be reduced for example on the air interface between user station and network.

BREIF DESCRIPTION OF THE DRAWINGS

An exemplary embodiment is described in more detail below with reference to the drawing, in which:

FIG. 1 shows an arrangement of network devices in a schematic communication system with method stages outlined therein for implementing a preferred method for distributing service logic and status information on signaling servers.

DETAILED DESCRIPTION OF THE INVENTION

FIG. 1 shows an outline of a communication system UMTS, which is preferably controlled on the basis of what is known as the Session Initiation Protocol (SIP). Only the network elements and network devices of relevance to the method described below are primarily shown.

With the exemplary embodiment described below, a communication connection is to be set up between a first user-side station A and a second user-side station B, to allow communication between these via the communication network UMTS. The two user-side stations A, B can be any data terminals, which advantageously support the SIP or a comparable protocol. In particular they can be cable-based or radio-based computers and telephones. It is also possible for one of these stations to be configured as a server for the passive delivery of requested data in the event of a corresponding request by the other station.

In order to set up a communication connection between one of the two stations A, B and the communication network, for example according to UMTS, what are known as SIP proxies PA or PB are provided in the area of the access network of the communication network. A station A, B, which is connected to the communication network UMTS, in other words is connected in particular to the corresponding SIP proxy PA or PB, in the SIP example sends what is known as a register message REGISTER for its registration at a first time t1 to the access device PA or PB.

As shown in FIG. 1, a service database DD is also provided in the communication network UMTS. One or a plurality of data logics and status information relating to a plurality of user-side stations A and B registered there are stored respectively in this database DD. After registration t1 of a station A or B with the corresponding access device PA or PB, at a second time t2 the corresponding access device PA or PB sends a request GET for transmission of the data relating to this correspondingly newly registered station A or B to the service database DD. After receipt of the request GET the service database DD sends service logic and/or status information to the requesting access device PA or PB. The access device PA or PB, which is preferably configured as a signaling server, thereby obtains the necessary service logic and/or the corresponding status information via a data path that preserves system resources. If the access device PA or PB is then to forward signaling messages from or to the station A or B, it can access the corresponding service logic and the corresponding status information for this station A or B and run the service logic or execute the instructions specified therein. In particular the status information can be accessed according to the service logic instructions, in order to modify it.

Advantageously, directly after an instruction to change service logic and/or status information, a corresponding update instruction can be transmitted from the access device PA or PB to the service database DD, as outlined with reference to the HTTP PUT instructions at a ninth time t9. Such updating of the data in the service database DD can of course also be implemented with a time delay or in particular when canceling the assignment of the station A, B to the corresponding access device PA or PB. The instruction to change the service logic and/or the status information in the area of the access device PA or PB can originate both from the assigned station A or B and from an independent further station, device or entity.

The service database DD can be configured both as a component of the communication network UMTS and as an external device. In particular it is also possible to equip the service database DD or another network device, for example a SIP proxy, with functions, which execute a corresponding functionality instead of the station A or B. This is advantageous, if for example a first station A, in respect of which data is to be changed, or a second station B, to which messages for example are to be sent, is not connected to the network or is not available for some other reason.

For example a request INVITE to set up a communication connection to the second station B could be sent out from the first station A after registration with a first access device PA, whereby the second station B for example is either not connected to the network or has stored a general instruction to forward information to another network device or network address in the access device PB assigned to it and/or the service database DD. In such a case, in the event of a request by the second station B, the service logic would reroute the request from a particular proxy or a correspondingly extended database by changing the address data correspondingly based on current status information. In the event that the second station B is itself not connected to the network, the corresponding function would be implemented in the service database DD or a correspondingly provided access device or other network device.

A simple exemplary embodiment of an advantageous method for distributed running of personalized communication services is described below with reference to FIG. 1. The network topology shown with two users A, B, their respective signaling servers or access devices PA or PB and the database DD is used as the basis for this. The assignment of the two stations A, B to the corresponding access devices, in this case signaling servers PA or PB, is to be effected here by means of the SIP register message REGISTER as known per se. The interface between the access devices and the service database DD is to be an interface, which is for example based on the Hypertext Transfer Protocol HTTP (RFC 2616). Cancellation of the assignment of a station A, B to the assigned signaling server or the assigned access device PA or PB is to be effected correspondingly by a SIP-De-REGISTER message.

On connection to the communication network UMTS, stations A, B respectively send a REGISTER message at a first time t1 to the corresponding access device PA or PB. The addresses of the corresponding access devices or SIP proxies PA or PB can be defined beforehand for the stations A or B via standard mechanisms, e.g. via what is known as multicast or according to DCHP (Dynamic Host Configuration Protocol), a standard dynamic station configuration protocol.

At a subsequent time t2 the corresponding access devices PA or PB use an HTTP GET request to request the service logic and status information relating to the corresponding registered station A or B from the service database DD and receive this.

At a later, third time t3 the first station A sends a request for a connection to be set up to the second station B by means of a SIP-INVITE message to the access device PA assigned to it. The access station PA assigned to it then runs the corresponding service logic at a fourth time t4. The request to set up a connection INVITE is then forwarded from the first access device PA at a fifth time t5 to the second access device PB.

At a sixth time t6 the second access device PB then runs the service logic, which is assigned to the second station B. Then at a seventh time t7 the connection request INVITE is forwarded from the second access device PB to the second station B. The connection between the stations A and B is thereby set up, with the service logic instructions assigned to the stations being taken into account in each instance, said instructions being transmitted beforehand when they registered, from the service database DD to the corresponding access devices PA or PB.

When one of the stations A, B wishes to be removed from the communication network UMTS or to terminate the connection, it sends a De-REGISTRATION message De-REGIST. At this later time t8 to the assigned access device PA or PB. The corresponding access devices PA or PB use an HTTP PUT instruction to write the status information modified during the previous fourth or sixth times t4, t6 back to the database DD, so that this is available to be called in updated form for future runs.

According to alternative embodiments an update of the corresponding data in the service database DD can also be initialized directly by a station A or B, by said station transmitting corresponding instructions via the access devices PA or PB when it first registers in the communication network or at a later time. Updates can of course also be undertaken by another device or entity in the communication network with corresponding authorization.

The invention claimed is:

1. A method for providing communication services in a communication system comprising;
    setting up, via a station, a connection or signaling to a or via an assigned access device of the communication system;
    running service-related instructions in the access device or another network device in conjunction with the connection or signaling; wherein the service-related instructions refer to a service logic in a form of a program code relating to the station or a requested station; and
    calling the service logic relating to the station by the access device, which executes the service-related instruction for providing the communication services, from a network-side service database, in which the service logic is stored.

2. The method according to claim 1, wherein status information is called from the service database DD or transmitted thereto with the service logic.

3. The method according to claim 1, wherein after a change to the service logic or status information, the service logic and/or status information is updated in the service database from the device running the service logic.

4. The method according to claim 2, wherein the data in the service database is updated after cancellation of a communication connection and/or after separation of the station from the assigned access device or the device running the service logic.

5. The method according to claim 1, wherein signaling between the station and at least the assigned access device is effected by means of Session Initiation Protocol.

6. The method according to claim 1, wherein an exchange of data with the service database is effected via an interface based on Hypertext Transfer Protocol.

7. A network-side network device, comprising:
    a storage device for storing station-related service logic data; and
    an interface for exchanging the data with a network device running the service logic, wherein a station sets up a connection or signaling to a or via an assigned access device of the communication system;
    service-related instructions are run in the access device or another network device in conjuction with the connection or signaling, wherein the service-related instructions refer to a service logic in a form of a program code relating to the station or a requested station; and
    the service logic relating to the station is called by the access device, which executes the service-related instruction for providing the communication services, from a network-side service database, in which the service logic is stored.

* * * * *